United States Patent [19]
Casey et al.

[11] 3,752,011
[45] Aug. 14, 1973

[54] METHOD AND APPARATUS FOR CONTROLLING A POWER TRANSMISSION

[75] Inventors: Gary L. Casey, Royal Oak, James A. Cogswell, II, Sterling Heights, Mich.

[73] Assignee: General Motors Corporation, Detroit, Mich.

[22] Filed: Oct. 18, 1971

[21] Appl. No.: 190,235

[52] U.S. Cl......................... 74/731, 74/645, 74/866
[51] Int. Cl........................ F16h 47/00, B60k 21/00
[58] Field of Search...................... 74/731, 645, 866

[56] References Cited
UNITED STATES PATENTS

| | | | |
|---|---|---|---|
| 3,653,281 | 4/1972 | Shirai et al. | 74/731 |
| 3,572,168 | 3/1971 | Shirai et al. | 74/752 A |
| 3,640,152 | 2/1972 | Shirai et al. | 74/752 A |
| 3,673,892 | 7/1972 | Kato et al. | 74/866 X |

*Primary Examiner*—Arthur T. McKeon
*Attorney*—Jean L. Carpenter Warren D. Hill et al.

[57] ABSTRACT

In a transmission having a torque converter and a gear set wherein a ratio shift is accomplished by disengaging a brake or clutch and engaging another, a smooth shift is effected by controlling the clutch or brake pressures as a function of continuously computed values of turbine torque, turbine acceleration, and instantaneous gear ratio. These three parameters are computed by electronic analog circuitry from measured values of engine speed, turbine speed and transmission output speed. A logic circuit responsive to shift command, turbine speed and output speed conditions the analog circuit for operation. The analog output signal is converted to pressure by a solenoid valve.

9 Claims, 10 Drawing Figures

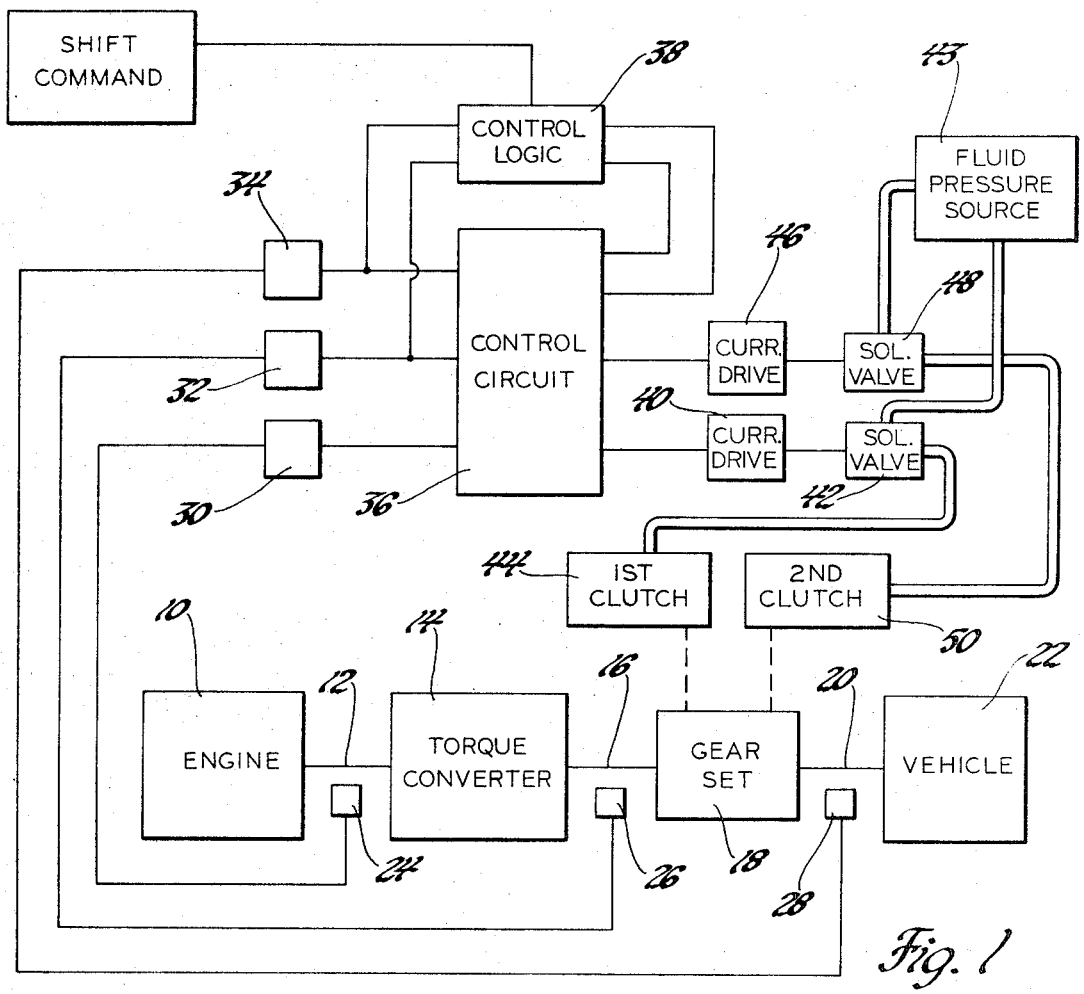

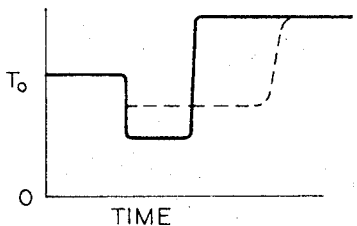
Fig. 4
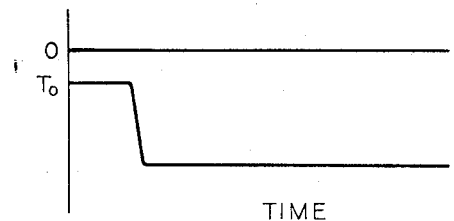
Fig. 5
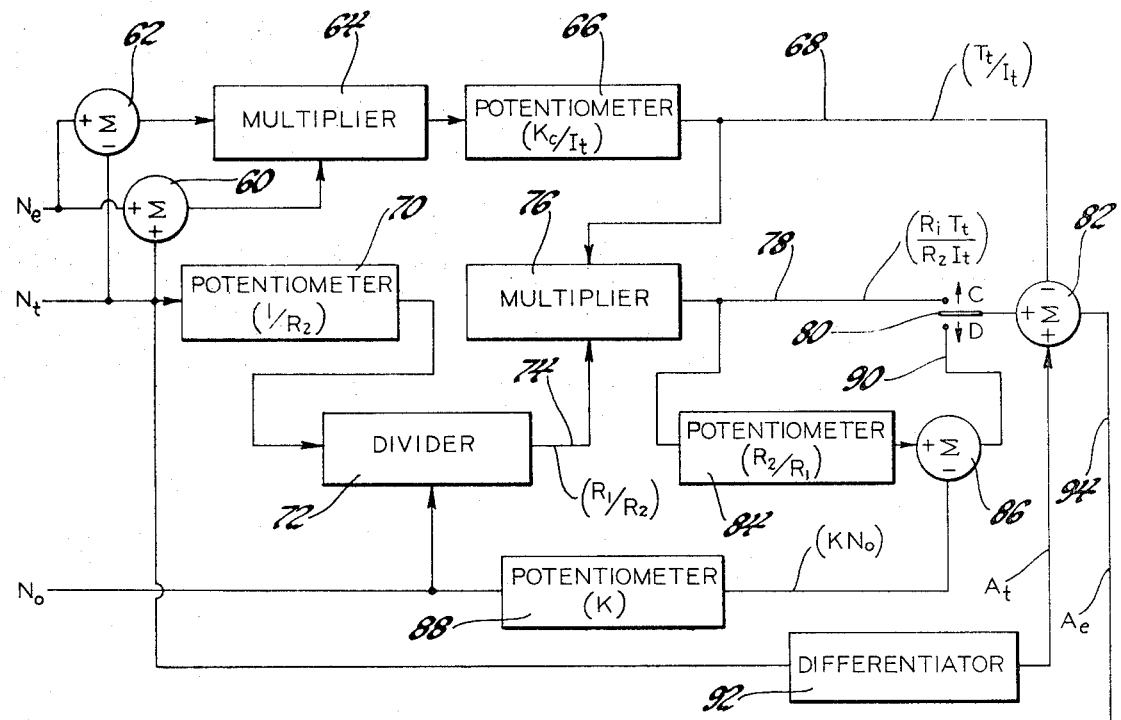
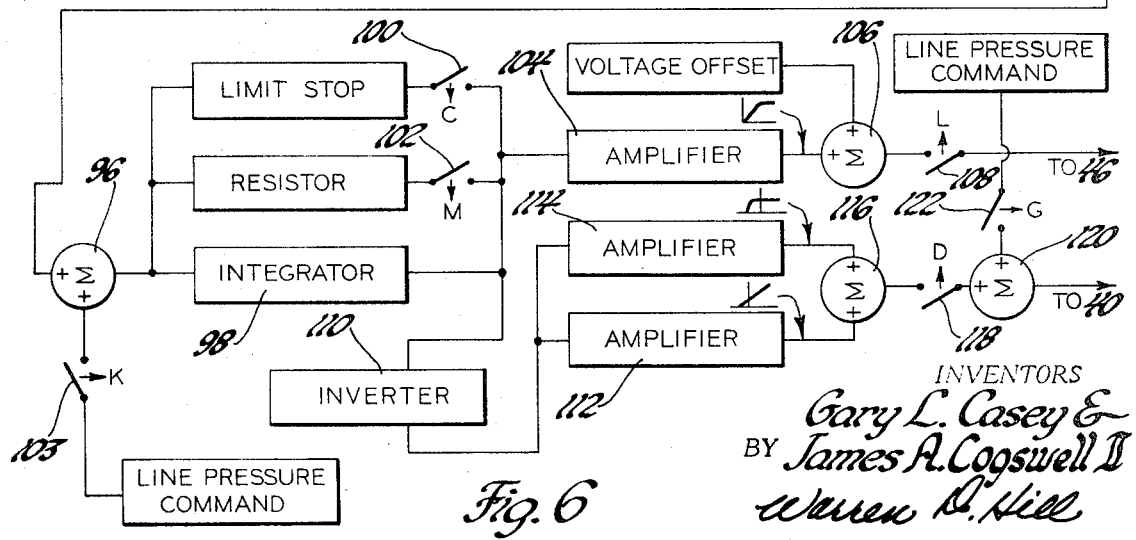
Fig. 6

Patented Aug. 14, 1973

INVENTORS
Gary L. Casey &
BY James A. Cogswell II

Warren D. Hill

ATTORNEY

METHOD AND APPARATUS FOR CONTROLLING A POWER TRANSMISSION

This invention relates to transmission controls and particularly to a method and apparatus for controlling a ratio change by modulating the torque capacity of elements within a transmission.

In automatic transmissions used on automotive vehicles, it is the general practice to engage a torque transmitting device (brake or clutch) to change the gear ratio and to provide freewheeling elements to render ineffective the device which was previously engaged so that it is necessary only to change the pressure on one torque transmitting device during the shift operation. Usually such pressure change is programmed to occur at a preset rate which is not the optimum rate for achieving a smooth shift under all conditions of vehicle operation.

It has been found that by controlling the pressures of both oncoming and offgoing devices according to fundamental transmission operating parameters, smoother shifts are achieved regardless of the vehicle operating condition, even, for example, when torque demand is changed during a shift operation. At the same time, the requirement of freewheeling devices in the gear set is eliminated.

It is therefore a general object of this invention to provide a method and apparatus for controlling the torque capacity of torque transmitting devices in a transmission having a fluid drive and a gear set during a shift as a function of a fluid drive torque parameter, turbine acceleration and instantaneous gear ratio.

It is another object of this invention to provide a method and apparatus for controlling the shift of a transmission having a torque converter and a gear set by sensing the input speed, the turbine speed and output speed, continuously computing therefrom the torque and acceleration of the turbine and the instantaneous gear ratio and controlling the torque capacity of the torque transmitting devices as a function of the computed parameters.

It is a further object of the invention to provide a method and apparatus for controlling the shift in a transmission having a torque converter and a gear set including an oncoming and an offgoing torque transmitting device responsive to pressure and controlling the pressures on both devices as a function of instantaneous gear ratio, turbine torque and turbine acceleration, which values are electronically computed from the input, output and turbine speeds.

It is still another object of the invention to provide a method for controlling the shift in a transmission having a torque converter and a gear set by sensing the speeds of the input and output members and the turbine, computing therefrom the turbine torque and acceleration and the instantaneous gear ratio, comparing the instantaneous gear ratio with the desired ratio to determine a ratio comparison and controlling the torque capacity of the torque transmitting devices as a function of the ratio comparison, turbine torque and the turbine acceleration to effect a smooth ratio transition under all conditions of vehicle operation without the use of freewheeling elements in the transmission gear set.

The apparatus used in carrying out the invention includes sensors for detecting input speed, turbine speed and output speed, an analog control circuit for computing from the speeds turbine torque, turbine acceleration, instantaneous gear ratio and a comparison of the instantaneous gear ratio to the desired gear ratio and computing therefrom the desired pressure change on the oncoming and offgoing torque transmitting devices, a logic circuit responsive to turbine speed, output speed and shift demand for conditioning the analog circuit and an electrohydraulic valve element for providing to the torque transmitting devices pressure changes as called for by the electrical output of the analog circuit.

The above and other advantages will be made more apparent from the following specification taken in conjunction with the accompanying drawings wherein like reference numerals refer to like parts and wherein:

FIG. 1 is a block diagram of a drive train for a vehicle and transmission control circuit according to the invention;

FIG. 2 is a diagrammatic model of a transmission;

FIGS. 3, 4 and 5 are graphs of desirable output torque characteristics for upshift, power - on downshift and overrun downshift respectively;

FIG. 6 is a functional block diagram of the analog control circuit according to the invention;

Figure 7:
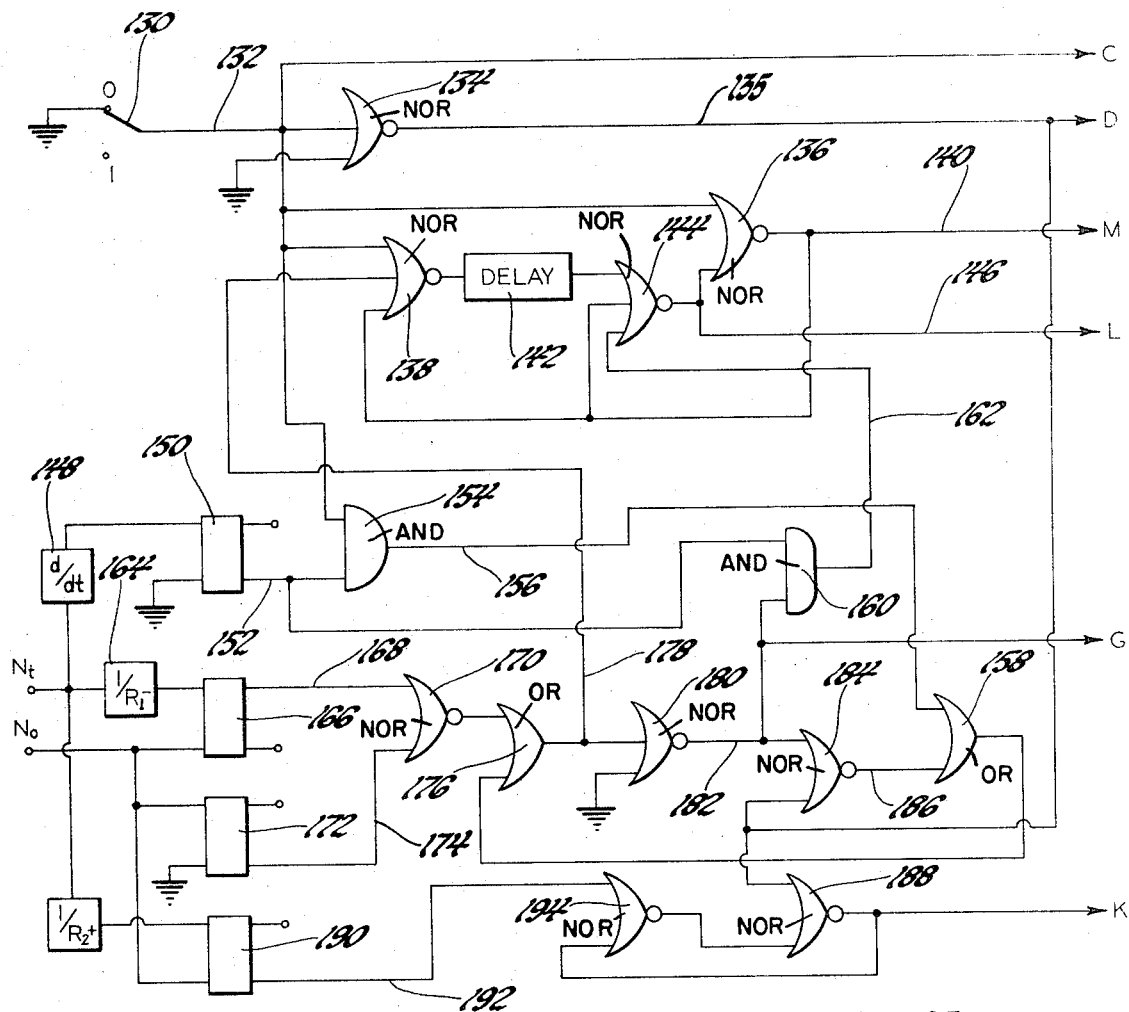
FIG. 7 is a diagram of a logic circuit for conditioning the analog control circuit of FIG. 6; and, FIGS. 8, 9 and 10 are graphs depicting integrator output, turbine acceleration, instantaneous gear ratio and clutch pressure occurring during upshift, power - on downshift and overrun downshift respectively.

To simplify the explanation of the invention, it is described herein in terms of a system capable of effecting an upshift from first to second gear ratios and a corresponding downshift by controlling the pressure on only two clutches or brakes, one engaging and the other disengaging during a shift. The extension of the principles described herein to transmissions having more than two ratios is readily apparent to one skilled in the art and is not specifically described.

FIG. 1 shows in block form a drive train for a vehicle and a transmission control. An engine 10 is connected by an input member 12 to a torque converter 14, which in turn is connected by a driven member 16 to a multi-ratio gear set 18. The transmission output 20 then drives the vehicle 22. The particular form of transmission used is illustrated in the U.S. Pat. to Winchell et al. No. 3,321,056 insofar as the mechanical components are concerned, with the exception, however, that no freewheeling devices are required in the gear set. Speed sensors 24, 26 and 28 which may be, for example, variable reluctance toothed wheel electromagnetic transducers, sense the input speed $N_e$ on the input shaft 12, the turbine speed $N_t$ as reflected by the speed of the driven member 16, and the output speed $N_o$ on the output member 20 respectively. The pulses from the sensors are operated upon by frequency-to-voltage converters 30, 32 and 34, such as shown in the U.S. Pat. to Johnston No. 3,405,779, to provide DC voltages proportional to input speed, turbine speed, and output speed respectively. These speed signals are fed to a control circuit 36. Further, the turbine speed and output speed signal are fed to a control logic circuit 38, the output of which provides an additional input to the control circuit 36. A shift command signal is provided as an additional input to the control logic circuit. The shift command signal may be provided by a manually operated switching arrangement or, if desired, may be an automatically generated signal as, for example, in the U.S. Pat. to Nelson No. 3,448,640.

The control circuit 36 provides a modulated output signal to a current driver amplifier 40 which is connected to a solenoid valve 42 which modulates pressure from a fluid pressure source 43 and transmits the modulated pressure to the first clutch 44 in the gear set 18. Similarly, a second output of the control circuit is amplified by a current driver amplifier 46 which operates a solenoid valve 48 to supply modulated pressure to the second clutch 50 in the gear set 18. The solenoid valves are of the type which provide an output pressure substantially proportional to input current, except for a small offset current required for initial valve opening. Such solenoid valves are well known and are typified by the U.S. Pat. to Schaeffer No. 3,225,619 issued Dec. 28, 1965. The first clutch 44 is that clutch in the transmission which is engaged in first gear ratio and becomes disengaged during a shift to second gear ratio. The second clutch 50 is disengaged in the first gear ratio and becomes engaged during a shift to the second gear ratio.

The philosophy of the control is best described by the model of FIG. 2 with reference to the desired output torque for an upshift shown graphically in FIG. 3. The model of the transmission in FIG. 2 depicts the torque converter 14 having a pump 51 and a turbine 52 wherein the turbine inertia is represented by $I_t$ and the turbine torque at the turbine input is $T_t$. The clutch torque $T_{c1}$ is that torque transmitted by the turbine 52 to the clutches in the gear set 18, while the torque on the output member 20 is $T_o$. To provide the smoothest possible normal upshift, as depicted in FIG. 3, the output torque at the start of the speed phase (point $a$) should be equal to the torque just prior to the shift (point $b$) and the torque at the end of the speed phase (point $c$) should be equal to the torque after the shift is completed (point $d$). Torque on the clutch $T_{c1}$ always equals $T_t - I_t A_t$ where $A_t$ is turbine acceleration. Assuming turbine acceleration is small, $T_o = R_1 T_{c1} = R_1 T_t$ just before the shift where $R_1$ is the first gear ratio. At the end of the shift $T_o = R_2 T_{c1} = R_2 T_t$, where $R_2$ is the second gear ratio. To connect points $a$ and $d$ with a smooth line, output torque is controlled to $T_o = R_i T_t$ where $R_i$ is the instantaneous transmission speed ratio. Since $T_o = R_2 (T_t - I_t A_t)$ a comparison of the desired output torque with the actual output torque provides a control equation $R_i T_t = R_2 (T_t - I_t A_t)$ which may be written as $(T_t/I_t) [(R_i/R_2) - 1] + A_t = 0$. This equation is true only when the oncoming clutch pressure is just sufficient to cause the desired turbine acceleration $A_t$. When, however, the clutch pressure is not just right, then $$(T_t/I_t)[(R_i/R_2) - 1] + A_t = A_e$$

or $$(T_t R_i/I_t R_2) - (T_t/I_t) + A_t = A_e$$

(1)

where $A_e$ represents the acceleration error. Thus the acceleration error may be computed as a function of turbine torque and acceleration and a comparison of the instantaneous ratio and the desired ratio. Note that the Equation number 1 may be written in other forms. For example, $(T_t/I_t R_2)(R_i - R_2) + A_t = A_e$. In this case, the acceleratn error is determined by the same parameters except that the ratio comparison is expressed in terms of a difference of ratios rather than a proportion of ratios. A desirable power - on downshift torque characteristic is shown by the curve of FIG. 4. A derivation similar to that of Equation number 1 yields the following control equation $$(T_t/I_t)[(R_i/I_1) - 1] + A_t = A_e$$

(2)

Similarly, the desirable overrun downshift torque characteristic is shown by FIG. 5 and a similar derivation will give the following equation:

$$-(T_t/I_t)[(R_i/R_1) - 1] + A_t = A_e$$

(3)

Note that Equation number 3 is the same as Equation number 2 except for the sign of the first term. However, during overrun downshift, turbine torque is always negative. By designing the implementing circuit such that negative turbine torques are indicated as zero, then the first term of Equation number 3 is zero and the sign thereof is irrelevant. Thus, the Equation number 2 may be used for both downshift conditions. Since a negative turbine torque is considered as zero, it is desirable to add an additional term proportional to output speed to provide a reference for the turbine acceleration term. Thus the downshift equation becomes $$(T_t/I_t)[(R_i/R_1) - 1] - KN_o + A_t = A_e$$

or $$(T_t R_i/I_t R_1) - (T_t/I_t) - KN_o + A_t = A_e$$

(4)

where $K$ is a constant. The effect of the $KN_o$ term during a power - on downshift is to provide a somewhat higher acceleration reference to cause a more rapid shift. With reference to FIG. 4, the broken line represents the torque characteristic which would prevail in the absence of the $KN_o$ term while the solid line indicates the characteristic in the presence of the $KN_o$ term.

The Equations number 1 and number 4 then become the control equations for upshift and downshift respectively. To implement a control it is necessary to provide a circuit which will solve the appropriate one of these equations according to the desired shift to establish an acceleration error signal $A_e$ and then integrate $A_e$ with respect to time to achieve an increasing or decreasing pressure control signal for effecting the necessary pressure change on the torque transmitting devices.

The functional circuit shown in FIG. 6 accomplishes this objective with the assistance of a logic circuit of FIG. 7. The input parameters are engine speed $N_e$, turbine speed $N_t$ and the output speed $N_o$. It has been found that turbine input torque $T_t$ is very closely approximated by the expression $K_c (N_e + N_t)(N_e - N_t)$ where $K_c$ is a torque converter constant. As shown in FIG. 6, the sum of $N_e$ and $N_t$ is formed by a summer 60 while a differential summer 62 derives the difference of $N_e$ and $N_t$. The summer outputs are multiplied by a multiplier 64 and the resultant product is scaled by a potentiometer 66 according to the fraction $K_c/I_t$. The output of potentiometer 66 on line 68 then is equal to $T_t/I_t$. $N_t$ is scaled by a potentiometer 70 which introduces the factor $1/R_2$ and the potentiometer output is divided by $N_o$ by divider 72 to produce on line 74 a signal equivalent to $R_i/R_2$, since $R_i = N_t/N_o$. A multiplier 76 having as inputs line 68 and 74 produces an ouput on line 78 to correspond to $R_i\,T_t/R_2\,I_t$. Line 78 extends to one contact of a switch 80, the armature of which is connected to a summer 82. Line 78 is also connected to a potentiometer 84 which introduces the fraction $R_2/R_1$ to provide an output equivalent to $R_i\,T_t/R_1\,I_t$ which output extends to a differentiating summer 86. A potentiometer 88 operates upon the input $N$ to produce an output $KN_o$ which is substracted from the output of the potentiometer 84 by the differential summer 86 which produces on line 90 a signal according to the function $(R_i\,T_t/R_2\,I_t) - KN_o$. Line 90 is connected to another stationary contact of relay 80. A differentiator 92 differentiates the input signal $N_t$ to provide an output $A_t$ which is fed to the summer 82. A subtracting input of summer 82 is connected to line 68. The armature of switch 80 is controlled by the control logic 38 to be moved to position C in contact with line 78 when an upshift is requested and is moved to position D to contact line 90 when a downshift is requested. Thus, during upshift, the output of the summer 82 on line 94 will be proportional to the control Equation number 1 and during a downshift will be proportional to the control Equation number 4.

The line 94 is connected through a summer 96 to an integrator 98 which is provided with a limit stop feedback circuit (e.g., a Zener diode) when switch 100 is closed to C position, and a feedback resistor when switch 102 is closed to M position, as controlled by the control logic circuit. The summer 96 has a second input through a switch 103 which when closed to the K position impresses a line pressure command to the integrator input.

The integrator output is amplified by an amplifier 104 which is so biased to provide an output signal proportional to the integrator output extending from zero to a positive maximum value. The amplified signal is fed to a summer 106 which has a fixed voltage offset supplied as another input thereto to compensate for solenoid valve offset. The summer output is connected to switch 108 which when closed to the L position connects the summer output to the current driver 46 for controlling the second clutch. The integrator output is also connected to an inverter 110, which in turn is connected to an amplifier 112 which is so biased as to produce a positive output signal beginning at zero when the inverter output is slightly negative and increases as the inverter output increases in a positive direction. This provides an overlap of clutch control since both amplifiers 104 and 112 will produce an output when the integrator output is at a low positive value. A trigger amplifier 114 responsive to the inverter output produces a step output signal at the same value that the amplifier 112 begins to produce an output. This step output is scaled by the amplifier gain to produce the required voltage offset to compensate for solenoid valve offset. The outputs of the amplifiers 112,114 are added by the summer 116 which is connected to switch 118 which is closed in the D position as controlled by the control logic circuit to pass the signal to a summer 120 which has as a second input a line pressure command which enters the summer through a switch 122 which is closed in the G position and controlled by the control logic. The output of the summer 120 is fed to the current driver 40 to control the pressure on the first clutch.

The control logic circuit 38 as shown in FIG. 7 has as its purpose to operate the various switches in the analog circuit of FIG. 6 according to the following truth table:

| CONDITION | SIGNAL | | | | | |
|---|---|---|---|---|---|---|
| | C | D | G | K | L | M |
| First Gear Operation | 0 | 1 | 1 | 0 | 0 | 1 |
| UPSHIFT: | | | | | | |
| Shift Point | 1 | 0 | 1 | 0 | 1 | 0 |
| Turbine Deceleration | 1 | 0 | 0 | 0 | 1 | 0 |
| $R_i = R_2\,^+$ | 1 | 0 | 0 | 1 | 1 | 0 |
| DOWNSHIFT: | | | | | | |
| Shift Point | 0 | 1 | 0 | 0 | 1 | 0 |
| $R_i = R_1\,^-$ | 0 | 1 | 1 | 0 | 1 | 0 |
| Turbine Deceleration | 0 | 1 | 1 | 0 | 0 | 1 |
| 0.5 seconds after $R_i = R_1\,^-$ | 0 | 1 | 1 | 0 | 0 | 1 |

$R_2\,^+$ is a value slightly higher than $R_2$ indicating the second ratio is nearly accomplished and $R_1\,^-$ is a value slightly below $R_1$ indicating the first ratio is nearly accomplished.

A shift command control represented by a switch 130 provides a zero logic input when first gear ratio is requested and a one logic input when the second gear ratio is requested. This input on line 132 directly provides the C logic output. The signal on line 132 also provides an input to a NOR gate 134 to provide the logic output D which is always opposite in logic level to the C output. The signal on line 132 further provides inputs to NOR gates 136 and 138. The output of gate 136 on line 140 provides the logic output M and also provides a second input to gate 138. The output of the gate 138 extends through a 0.5 second delay 142 to the input of a NOR gate 144 which has a second input from line 140. The output of the NOR gate 144 on line 146 provides the logic output L and also provides a second input to the NOR gate 136.

The turbine speed input $N_t$ is fed through a differentiator 148 to an input of a comparator 150 which has a second input of zero. An inverting output of the comparator 150 on line 152 then has a logic level of one when the turbine is decelerating. The line 152 forms an input to AND gate 154 which has line 132 as a second input. The output of the AND gate on line 156 provides an input to an OR gate 158. The line 152 also forms an input to AND gate 160, the output of which on line 162 is a third input of NOR gate 144. A potentiometer 164 having the function of $1/R_1\,^-$ operates on the input $N_t$ to form one input signal to a comparator 166. The second comparator input is $N_o$. The comparator output signal then is at a logic level of one when $(N_t/R_1\,^-) > N_o$ or $R_i > R_1\,^-$. That signal on line 168 forms an input to a NOR gate 170. A comparator 172 has as inputs $N_o$ and zero and provides a logic zero output on line 174 when $N_o > 0$. Line 174 forms a second input to the NOR gate 170. The output of gate 170 is an input to an OR gate 176 which provides an output on line 178 which forms inputs to the NOR gates 138 and 180, the latter having a second input of zero. The output 182 of gate 180 is the logic output G which is also an input of the AND gate 160 and an input of the NOR gate 184. The output 186 of the gate 184 forms an input for the OR gate 158, the output of which forms an input to the OR gate 176. The output logic signal D on line 135 provides a second input to the NOR gate 184 as well as an input to the NOR gate 188. A potentiometer having a function of $1/R_2\,^+$ operates on the input signal $N_t$ to provide an input to a comparator 190, the second input thereof being $N_o$. The inverted output line 192 of the comparator 190 is then zero when $(N_t/R_2^+ < N_o$ or $R_i < R_2^+$. The signal on line 192 is an input to a NOR gate 194, the output of which forms the second input of NOR gate 188. The output of 188 comprises a feedback to an input of NOR gate 194. The output of gate 188 also provides the logic output K.

Figure 8:
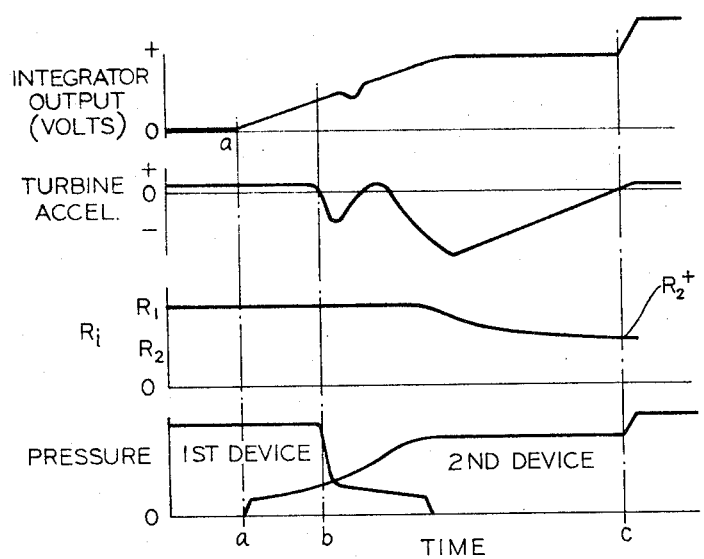

Thus considering FIGS. 6 and 7 together, when the vehicle is operating in first gear, switches 100, 103 and 108 are open; switches 102, 118 and 122 are closed and the switch 80 is in the D position, as indicated by the truth table. The effect of that circuit condition is that full line pressure is applied to the first clutch, the second clutch is completely disengaged and the integrator output voltage is zero. These conditions are shown in FIG. 8 which graphically displays the integrator output, the turbine acceleration, $R_i$, and pressures on the torque transmitting devices versus time for an upshift.

When a shift to second gear is requested at time a by operating the switch 130, the switch 100 closes, the switch 108 closes, the switch 118 opens and the switch 80 is moved to C position so that the second clutch control is enabled and the signal $A_e$ will be computed according to Equation number 1. Also, the switch 102 will open. The feedback circuit incorporating the switch 102 has the effect of modifying the integrator circuit 98 to change it to a low gain first order filter when the switch is closed. Thus, when switch 102 opens, the integrator 98 acts strictly as an integrator with the exception of the limit stop put in circuit by closing of the switch 100 which has the effect of preventing negative integrator output voltages and preventing integrator saturation. The limit stop may, for example, be a Zener diode placed across the integrating capacitor. The opening of switch 118 indicates that during the upshift, the first clutch will not be directly subject to the integrator output. Since at the time of upshift initiation, $R_i$ equals $R_1$ and is different from $R_2$ in Equation number 1, a substantial acceleration error $A_e$ will be indicated causing the integrator output voltage to increase so that the pressure on the second clutch will increase. When the second clutch pressure becomes great enough to cause substantial torque transmission through the second clutch, the turbine will decelerate at time b to energize line 152 in the logic control circuit to effect the opening of the switch 122 thereby removing the line pressure command from the first clutch and allowing the first clutch pressure to rapidly drop. The integrator voltage and the second clutch pressure continues to increase until the turbine deceleration satisfies Equation number 1. This turbine deceleration and resultant decrease in turbine speed reduces the instantaneous speed ratio $R_i$ which thereby modifies the deceleration level requirements as it approaches the desired ratio $R_2$ and becomes equal to $R_2^+$ at time c. At that point, switch 103 is closed to assert a line pressure command on the integrator input causing the integrator output to rapidly reach its maximum value to place full line pressure on the second clutch to complete the shift. Then, so long as the transmission remains in second gear ratio the first clutch will be disengaged, the second clutch will be engaged and the integrator voltage will be at a maximum value.

Figure 9:
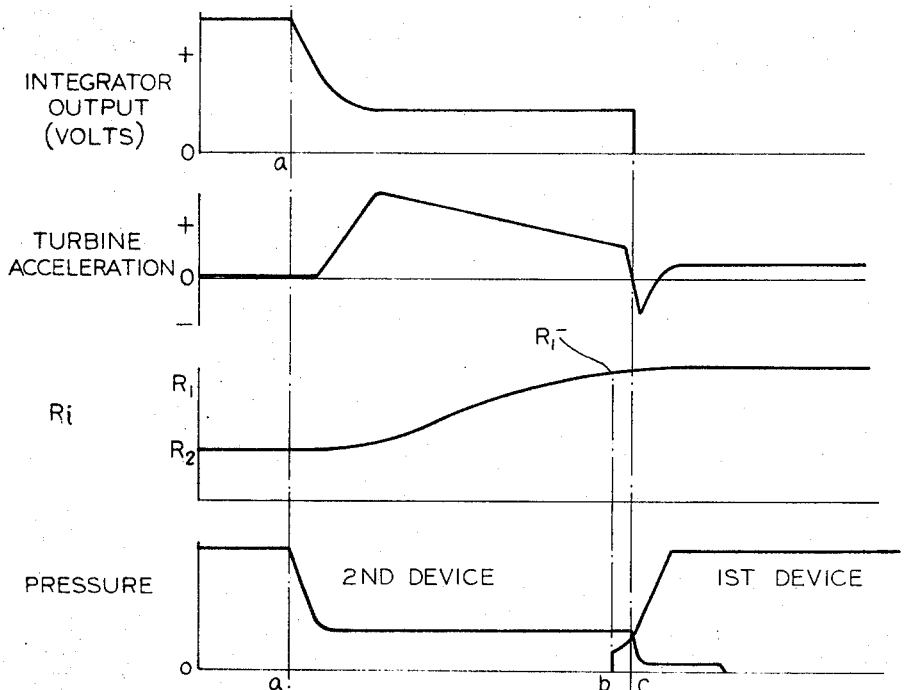
Figure 10:
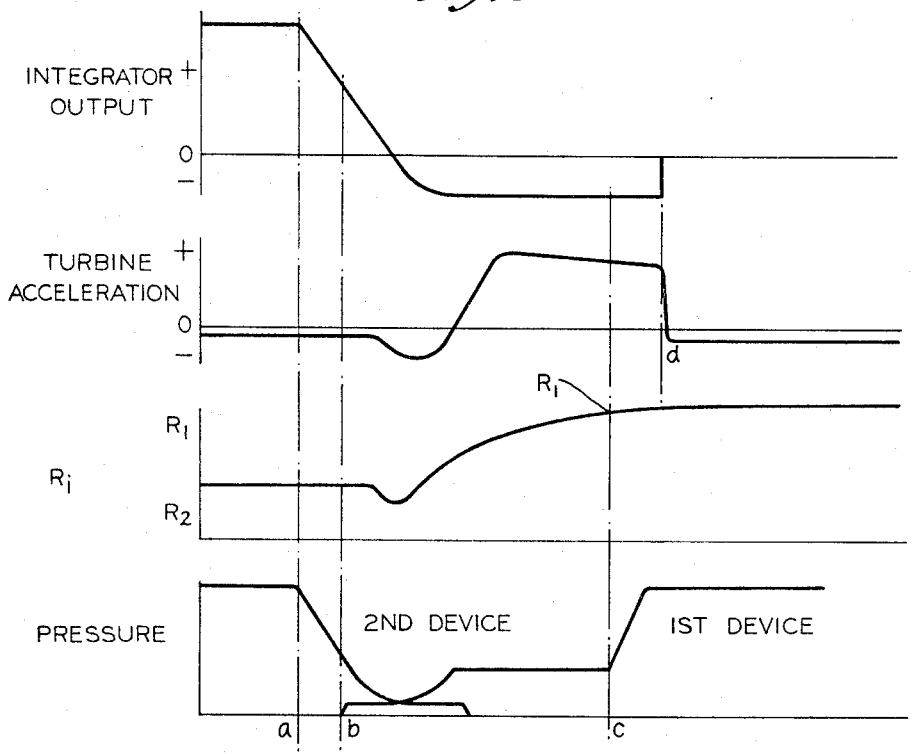

When a downshift signal requests a shift from second gear ratio to first gear ratio, the logic circuit operation requires that the switch 80 be moved to D position, that the switches 100 and 103 open and the switch 118 closes. The opening of the switch 103 removes the line pressure command from the second clutch control so that that clutch is under control of the analog control circuit. The opening of switch 100 removes the limit stop from the integrator 98 so that negative integrator output voltages will be permitted and the closing of the switch 118 places the first clutch under the control of the integrator so that during a downshift, either clutch can be controlled. The moving of switch 80 to the D position effects the computation of $A_e$ according to Equation number 4. The acceleration error signal during the downshift will initially be negative because of the negative sign of the $KN_o$ term and because of the relative values of $R_i$ and $R_1$. The integrator output will therefore gradually decrease from its maximum value, as shown in FIGS. 9 and 10 which are similar to FIG. 8 but correspond to a power - on and an overrun downshift respectively.

In the case of a power - on downshift, beginning at shift initiation, point a, the second clutch pressure will drop to a value sufficient to allow controlled clutch slippage and the second clutch will be controlled by the integrator output until the turbine decelerates at time c. Also at time c switch 102 closes to null the integrator output to zero. In the meantime, at time b, $R_i$ reaches the value $R_1^-$ whereupon switch 122 closes to apply a line pressure signal on the first clutch control to complete the shift. If for any reason the turbine fails to decelerate, the second clutch control will be deactivated 0.5 seconds after time b to force completion of the shift.

In the case of an overrun downshift, the integrator output and the second clutch pressure will rapidly drop beginning at time a and the first clutch will be first applied at time b when the integrator voltage reaches a small positive value and will then be controlled in a slipping mode until $R_1 = R_1^-$ at time c. The second clutch will continue to be controlled by the integrator until its output becomes negative. When the turbine decelerates, at time d, the integrator output is nulled to zero. Thus in either downshift mode, the operation of the logic circuit is essentially the same.

The embodiment of the invention described herein is for purposes of illustration and the scope of the invention is intended to be limited only by the following claims.

It is claimed:

1. A method of controlling a ratio change in a transmission having a fluid drive means including an input member and a driven member, and a multiratio gear train including engageable variable torque capacity torque transmitting means for effecting a ratio change and an output member comprising continuously determining the input torque of one of the fluid drive members, the acceleration of the driven member and the instantaneous gear ratio, applying a shift signal to request a change to a desired ratio, continuously comparing the instantaneous gear ratio with the desired ratio to determine the ratio comparison, and variably controlling the torque capacity of the torque transmitting means during the ratio change as a function of the ratio comparison, input torque and the driven member acceleration to smoothly bring the instantaneous gear ratio to a value substantially consistent with the desired ratio.

2. A method of controlling a ratio change in a transmission having a fluid drive means including an input member and a driven member, and a multiratio gear train including engageable variable torque capacity torque transmitting means for effecting a ratio change and an output member comprising sensing the speeds of the input member, the driven member and the output member, continuously determining from the sensed speeds the input torque of the driven member, the acceleration of the driven member and the instantaneous gear ratio, applying a shift signal to request a change to a desired ratio, continuously comparing the instantaneous gear ratio with the desired ratio to determine the ratio comparison, and variably controlling the torque capacity of the torque transmitting means during the ratio change as a function of the ratio comparison, the driven member input torque and the driven member acceleration to smoothly bring the instantaneous gear ratio to a value substantially consistent with the desired ratio.

3. A method of controlling a ratio change in a transmission having a fluid drive means including an input member and a turbine, and a multiratio gear train including pressure responsive ratio selecting means and an output member comprising sensing the speeds of the input member, the output member and the turbine, continuously determining from the sensed speeds the turbine input torque, the turbine acceleration and the instantnaeous gear ratio, applying a shift signal to request a change to a desired ratio, continuously comparing the instantaneous gear ratio with the desired ratio to determine the ratio comparison, and variably controlling the pressure on the ratio selecting means during the ratio changer as a function of the ratio comparison, the turbine input torque and the turbine acceleration to smoothly bring the instantaneous gear ratio to a value substantially consistent with the desired ratio.

4. A method of controlling a ratio change in a transmission having a fluid drive means including an input member and a turbine, and a multi-ratio gear train including pressure responsive ratio selecting means and an output member comprising sensing the speeds of the input member, the output member and the turbine, continuously determining from the sensed speeds the turbine input torque, the turbine acceleration and the instantaneous gear ratio, applying a shift signal to signal a change to a desired ratio, continuously comparing the instantaneous gear ratio with the desired ratio to determine the ratio comparison, and variably controlling the pressure on the ratio selecting means during the ratio change according to the integral of the quantity comprising the turbine acceleration plus the turbine input torque times a function of the ratio comparison to smoothly bring the instanteous gear ratio to a value substantially consistent with the desired ratio.

5. A method of controlling a ratio change in a transmission having a torque converter including an input member and a turbine, and a multiratio gear train including pressure responsive ratio selecting means and an output member comprising sensing the speeds of the input member, the output member and the turbine, continuously determining the turbine input torque as a function of the speed of the input member and the turbine, continuously determining the turbine acceleration as a function of turbine speed, continuously determining the instantaneous gear ratio as the ratio of turbine speed to output member speed, applying a shift signal to request a change to a desired ratio, continuously comparing the instantaneous gear ratio with the desired ratio to determine the ratio comparison and variably controlling the pressure on the ratio selecting means during the ratio change as a function of the ratio comparison, the turbine input torque and the turbine acceleration to smoothly bring the instantaneous gear ratio to a value substantially consistent with the desired ratio.

6. A method of controlling a ratio change in a transmission having a torque converter including an input member and a turbine, and a multi-ratio gear train including an output member, and a pair of selectively engageable, pressure responsive torque transmitting devices having variable torque capacities wherein a ratio change is effected by engaging one of the devices and disengaging the other of the devices, comprising the steps of sensing the speeds of the input member, the output member and the turbine, continuously determining from the sensed speeds the turbine input torque, the turbine acceleration and the instantaneous gear ratio, applying an upshift signal to request a change to a desired ratio, continuously comparing the instantaneous gear ratio with the desired ratio to determine the ratio comparison, variably controlling the pressure on the engaging device during the ratio change as a function of the ratio comparison, the turbine input torque and the turbine acceleration to thereby gradually increase the torque capacity of the engaging device to smoothly bring the instantaneous gear ratio to a value substantially consistent with the desired ratio, rapidly disengaging the other device in response to turbine deceleration which occurs as a result of the increased torque capacity of the engaging device, and increasing the pressure on the engaging device to effect complete engagement thereof when the instantaneous gear ratio reaches a prescribed value which is close to the desired ratio.

7. A method of controlling a ratio change in a transmission having a torque converter including an input member and a turbine, and a multi-ratio gear train including an output member and a pair of selectively engageable, pressure responsive torque transmitting devices having variable torque capacities wherein a ratio change is effected by engaging one of the devices and disengaging the other of the devices, comprising the steps of sensing the speeds of the input member, the output member and the turbine, continuously determining from the sensed speeds the turbine input torque, the turbine acceleration and the instantaneous gear ratio, applying a downshift signal to request a change to a desired ratio, continuously comparing the instantaneous gear ratio with the desired ratio to determine the ratio comparison, variably controlling the pressures on the devices during the ratio change as a function of the ratio comparison, the turbine input torque, the turbine acceleration and the speed of the output member for thereby gradually decreasing the torque capacity of the disengaging device and then increasing the torque capacity of the engaging device to smoothly bring the instantaneous gear ratio to a value substantially consistent with the desired ratio, increasing the pressure on the engaging device to effect complete engagement thereof when the instantaneous gear ratio reaches a prescribed value which is close to the desired ratio.

8. A control for effecing a ratio change in a transmission having a fluid drive means including an input member and a driven member, and a multiratio gear train including engageable variable torque capacity torque transmitting means for effecting a ratio change, and an output member comprising sensing means for sensing the speeds of the input member, the driven member and the output member, means for continuously determining from the sensed speed the input torque of the driven member, the acceleration of the driven member and the instantaneous gear ratio, means for applying a shift signal to request a change to a desired ratio, means for continuously comparing the instantaneous gear ratio with the desired ratio to determine the ratio comparison and means for variably controlling the torque capacity of the torque transmitting means during the ratio change as a function of the ratio comparison, the driven member input torque and the driven member acceleration to smoothly bring the instantaneous gear ratio to a value substantially consistent with the desired ratio.

9. A control for effecting a ratio change in a transmission having a torque converter including an input member and a turbine, and a multiratio gear train including an output member and a pair of selectively engageable pressure responsive torque transmitting devices having variable torque capacities wherein a ratio change is effected by engaging one of the devices and disengaging the other of the devices, and pressure regulating means responsive to a control signal for controlling the pressure on the devices, comprising means for sensing the speeds of the input member, the output member and the turbine and providing electrical signals representing the speeds, a circuit responsive to the input member and turbine speed signals for continuously determining the turbine input torque, a circuit responsive to the turbine speed signal for continuously determining the turbine acceleration, a circuit responsive to the turbine speed signal and the output member speed signal for continuously determining the instantaneous gear ratio as the ratio of the turbine speed to the output member speed, means for applying a shift signal to request a change to a desired ratio, a circuit for continuously comparing the instantaneous gear ratio with the desired ratio to determine the ratio comparison and a circuit for providing the control signal and therefore variably controlling the pressure on the devices during the ratio change according to the integral of the quantity comprising the turbine acceleration plus the turbine input torque times a function of the ratio comparison to smoothly bring the instantaneous gear ratio to a value substantially consistent with the desired ratio.

* * * * *